(12) United States Patent
Nagaraj et al.

(10) Patent No.: US 10,524,213 B2
(45) Date of Patent: Dec. 31, 2019

(54) POWER CONTROL FOR SYSTEMS BASED ON UPLINK LINK IDENTIFIER

(71) Applicant: Intel IP Corporation, Santa Clara, CA (US)

(72) Inventors: Shirish Nagaraj, Pleasanton, CA (US); Jong-Kae Fwu, Sunnyvale, CA (US); Bishwarup Mondal, San Ramon, CA (US); Ajit Nimbalker, Fremont, CA (US); Yuan Zhu, Beijing (CN); Sungho Moon, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/072,217

(22) PCT Filed: May 27, 2016

(86) PCT No.: PCT/US2016/034566
§ 371 (c)(1),
(2) Date: Jul. 24, 2018

(87) PCT Pub. No.: WO2017/146755
PCT Pub. Date: Aug. 31, 2017

(65) Prior Publication Data
US 2019/0075526 A1 Mar. 7, 2019

Related U.S. Application Data

(60) Provisional application No. 62/299,279, filed on Feb. 24, 2016.

(51) Int. Cl.
*H04W 52/24* (2009.01)
*H04W 52/42* (2009.01)
*H04B 7/0408* (2017.01)
*H04B 7/06* (2006.01)
*H04W 52/14* (2009.01)
*H04L 1/00* (2006.01)
*H04B 7/0413* (2017.01)

(52) U.S. Cl.
CPC ........ *H04W 52/245* (2013.01); *H04B 7/0408* (2013.01); *H04B 7/0617* (2013.01);
(Continued)

(58) Field of Classification Search
CPC .. H04B 7/0408; H04B 7/0413; H04B 7/0617; H04L 1/0003; H04W 52/146; H04W 52/242; H04W 52/245; H04W 52/42
(Continued)

(56) References Cited

U.S. PATENT DOCUMENTS

| 6,278,701 | B1 * | 8/2001 | Ayyagari | H04B 7/264 370/310 |
| 2006/0083267 | A1 * | 4/2006 | Laroia | H04B 1/40 370/503 |

(Continued)

OTHER PUBLICATIONS

International Search Report dated Oct. 6, 2016 for International Application PCT/US2016/034566.

*Primary Examiner* — Tan H Trinh
(74) *Attorney, Agent, or Firm* — Eschweiler & Potashnik, LLC

(57) ABSTRACT

Techniques for transmit power control calculation by user equipments (UEs) are discussed. An example apparatus employable by a UE comprises a processor configured to: configure, for each active link of a set of active links, a distinct set of power control parameters, wherein each active link comprises a distinct combination of a UE beam of a set of UE beams and a transmission/reception point (TRP) beam of a set of TRP beams; process an uplink (UL) grant received via a control channel that indicates a first active link of the set of active links, wherein the first active link comprises a first UE beam and a first TRP beam; calculate a first transmit power based at least in part on the distinct set of power control parameters configured for the first active link; and output UL data for transmission via the first UE beam at the first transmit power.

30 Claims, 8 Drawing Sheets

(52) U.S. Cl.
CPC ......... *H04L 1/0003* (2013.01); *H04W 52/146* (2013.01); *H04W 52/242* (2013.01); *H04W 52/42* (2013.01); *H04B 7/0413* (2013.01)

(58) Field of Classification Search
USPC ......... 455/69, 522, 13.1, 126; 370/310, 252, 370/503
See application file for complete search history.

(56) References Cited

U.S. PATENT DOCUMENTS

| | | | |
|---|---|---|---|
| 2008/0039129 A1* | 2/2008 | Li | H04L 1/0003 455/522 |
| 2011/0076969 A1* | 3/2011 | Ericson | H04W 4/20 455/126 |
| 2012/0320874 A1 | 12/2012 | Li et al. | |
| 2014/0185481 A1* | 7/2014 | Seol | H04W 52/42 370/252 |
| 2014/0315594 A1* | 10/2014 | Jeong | H04W 52/146 455/522 |
| 2016/0286590 A1* | 9/2016 | Cheng | H04W 4/90 |
| 2017/0273027 A1* | 9/2017 | Kim | H04W 52/286 |
| 2017/0373731 A1* | 12/2017 | Guo | H04B 1/707 |
| 2018/0054830 A1* | 2/2018 | Luo | H04W 72/0493 |
| 2019/0089435 A1* | 3/2019 | Mondal | H04B 17/318 |

\* cited by examiner

POWER CONTROL FOR SYSTEMS BASED ON UPLINK LINK IDENTIFIER

REFERENCE TO RELATED APPLICATIONS

This application is a National Phase entry application of International Patent Application No. PCT/US2016/034566 filed May 27, 2016, which claims priority to U.S. Provisional Application 62/299,279 filed on Feb. 24, 2016, entitled "POWER CONTROL FOR 5G BASED ON UPLINK LINK IDENTIFIER" in the name of Shirish Nagaraj et al. and is hereby incorporated by reference in its entirety.

FIELD

The present disclosure relates to wireless technology, and more specifically to techniques for implementing transmit power control for beamformed uplink transmissions in fifth generation (5G) systems.

BACKGROUND

In order to satisfy the ever-increasing demand for data, 5G radio access technologies (RATs) will involve communication at very high carrier frequencies such as the millimeter Wave (mmWave) spectrum, where bandwidth is plentiful. However, the cost to moving to such high frequencies is that electromagnetic wave propagation is poor. To address this, highly directional antenna arrays can be employed at both the base station (e.g., Evolved NodeB (eNB), etc.) and user equipment (UE), in order to overcome large path losses due to attenuation from wall penetration, foliage, blocking etc.

DETAILED DESCRIPTION

Figure 1:
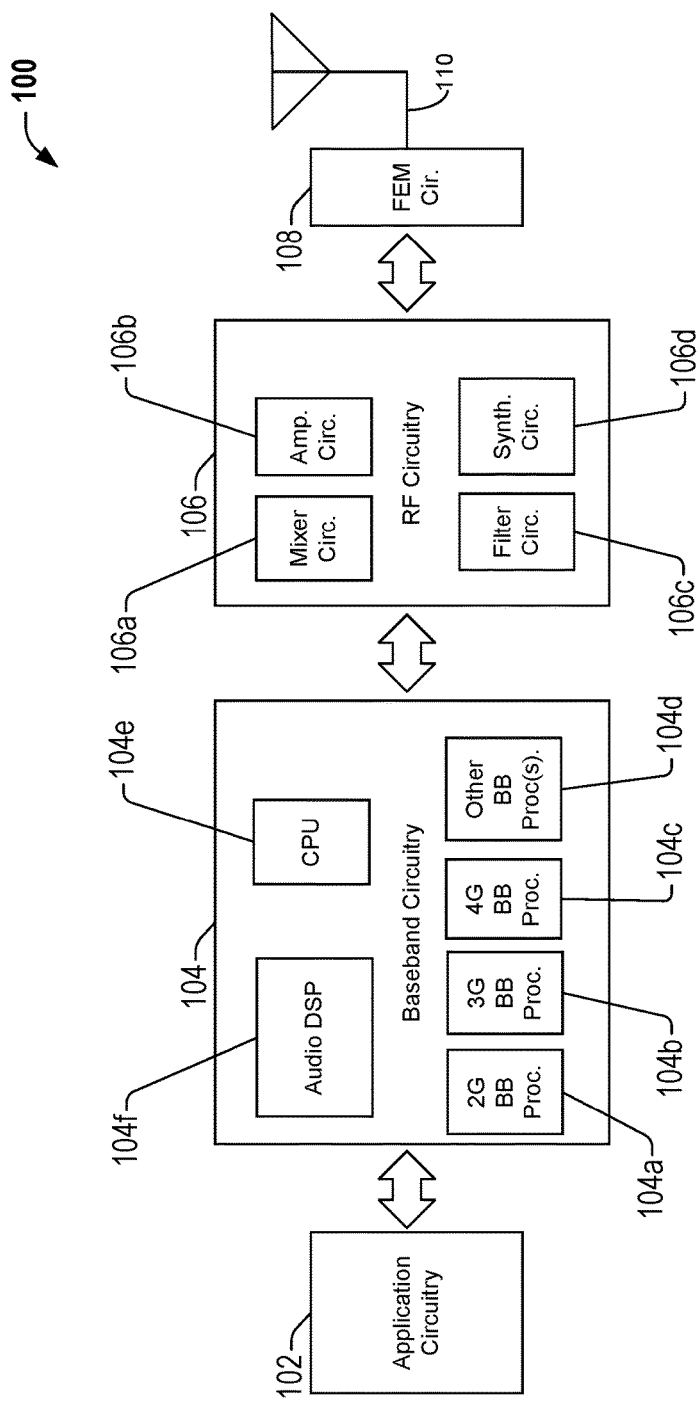
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with a base station (BS) such as an Evolved NodeB (eNB).

Various aspects discussed herein facilitate transmit power control for uplink (UL) data channels in fifth generation (5G) systems. Embodiments discussed herein can address the unique user multiplexing constraints imposed by the analog beamforming employed in a 5G air interface.

Figure 2:
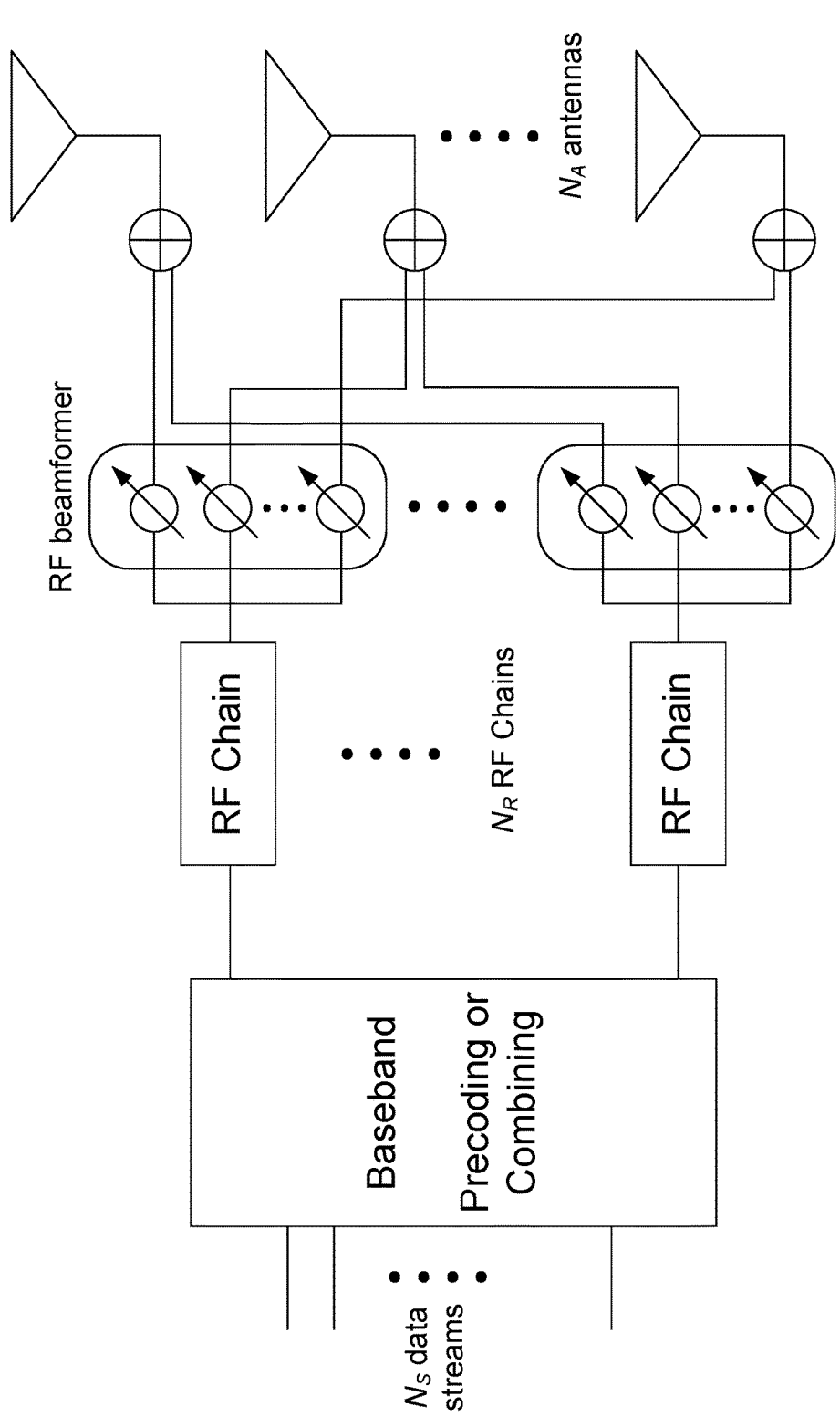
FIG. 2 is a diagram illustrating an example hybrid beamforming architecture that can be employed in connection with various aspects described herein.

Due to the large bandwidth of operation of fifth generation (5G) radio access technologies (RATs), digital-to-analog (DAC) and analog-to-digital (ADC) converters can be operated at very high sampling rates, making hardware very power inefficient and expensive. This motivates the design of hybrid analog plus digital beamforming architectures, wherein the hardware has the ability to form one or a few analog beams (e.g., chosen potentially dynamically from a set of fixed beams, which can each correspond to a particular look direction). These radio frequency (RF) ports then can be digitally combined for the uplink (UL) for supporting SU (single-user)-/MU (multi-user)-MIMO (multiple-input multiple-output) and diversity transmission and reception. Referring to FIG. 2, illustrated is a diagram of an example hybrid beamforming architecture that can be employed in connection with various aspects described herein.

Various embodiments discussed herein can facilitate the transmit power of UL beamformed transmission and reception. According to aspects described herein, an Evolved NodeB (eNB) can employ flexibility in allocating different links (e.g., wherein each link can comprise a set of a transmit beam and a receive beam) to users, which can allow the eNB to multiplex more users on the uplink. In various aspects, a Link identifier (ID) can be indicated as part of the UL grant message, so that the UE can autonomously decide which beamformed pathloss value to use in its power control formula. In some aspects, mechanisms for per-link closed-loop adaptation and/or for interference control and co-ordination can also be employed.

Figure 3:
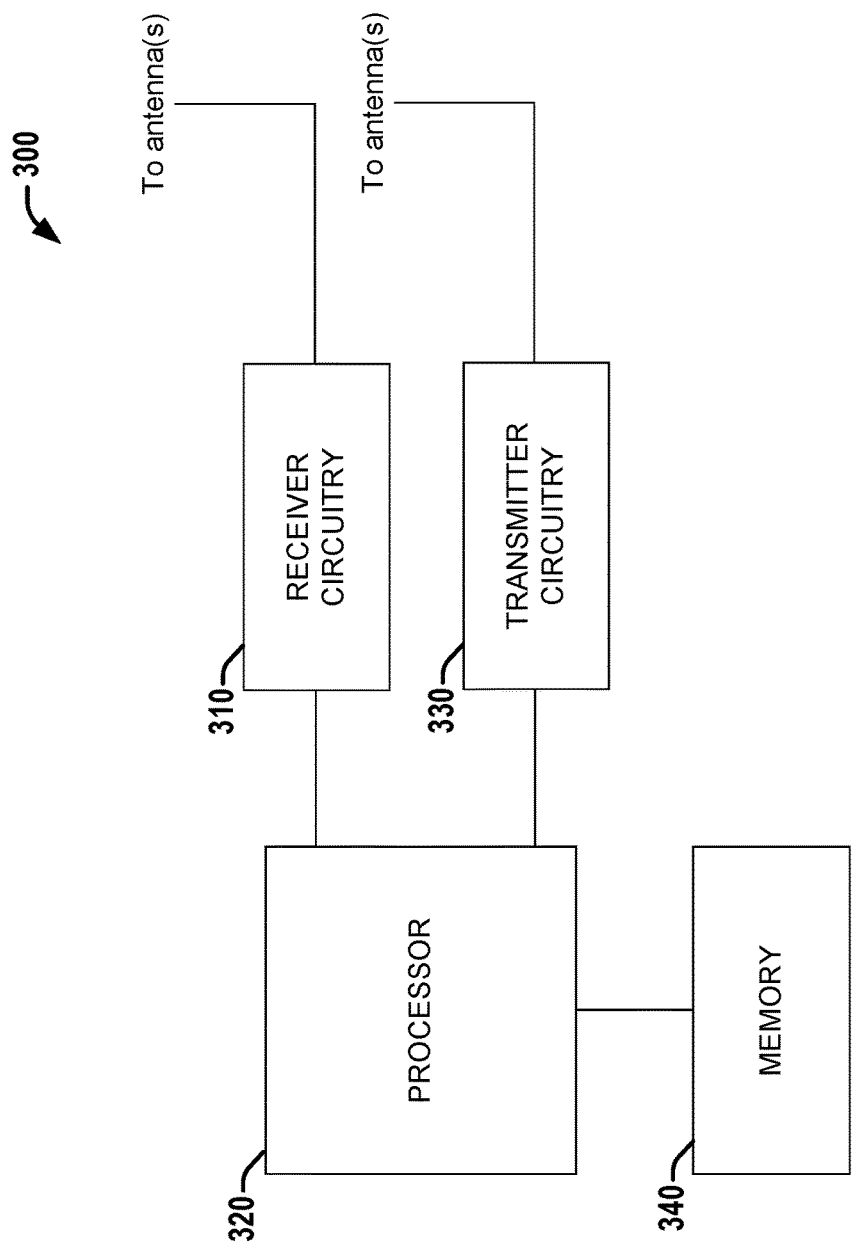
FIG. 3 is a block diagram illustrating a system that facilitates transmit power control at a user equipment (UE) according to various aspects described herein.

Referring to FIG. 3, illustrated is a block diagram of a system 300 that facilitates transmit power control at a user equipment (UE) according to various aspects described herein. System 300 can include receiver circuitry 310, a processor 320 (e.g., a baseband processor such as one of the baseband processors discussed in connection with FIG. 1), transmitter circuitry 330, and a memory 340 (which can comprise any of a variety of storage mediums and can store instructions and/or data associated with one or more of receiver circuitry 310, processor 320, or transmitter circuitry 330). In various aspects, system 300 can be included within a user equipment (UE). As described in greater detail below, system 300 can facilitate determination of transmit power at the UE for a beamformed uplink (UL) transmission.

Receiver circuitry 310 can receive a distinct set of beam reference signals (BRSs) from each transmission/reception point (TRP) beam of a set of TRP beams (e.g., comprising one or more TRP beams), which can each be received over one or more UE beams. The set of TRP beams can be received from a common TRP or from multiple TRPs at distinct locations, and each of those TRPs can transmit one or more of the TRP beams over which receiver circuitry 310 receives a distinct set of BRSs.

Processor 320 can process the distinct set of BRSs received from each TRP beam of the set of TRP beams, and can measure a distinct beam-specific reference signal received power (B-RSRP) for that TRP beam for each UE beam of a set of UE beams. Each of the measured B-RSRPs can be associated with a distinct link (comprising a TRP beam and a UE beam) of a set of links (e.g., with each link comprising a distinct combination of a TRP beam with a UE beam; for example, a first link can comprise TRP beam 1 and UE beam 1, a second link can comprise TRP beam 2 and UE beam 1, and a third link can comprise TRP beam 3 and UE beam 2, etc.), which can comprise one or more active links, and possibly one or more non-active links.

Processor 320 can generate a B-RSRP report comprising one or more of the measured B-RSRPs (e.g., the Z highest B-RSRPs among B-RSRPs associated with distinct TRP beams, where Z can be predetermined or configured via higher layer signaling, etc.), and can output the B-RSRP report to transmitter circuitry 330 for transmission to an eNB via a serving UL link of the set of links.

Receiver circuitry 310 can receive, and processor 320 can process, a set of configuration messages received via higher layer signaling (e.g., radio resource control (RRC), medium access control (MAC), etc.). Based on the set of configuration messages, processor 320 can configure a set of active links as a subset of the set of links (e.g., which can be determined by the eNB based at least in part on the B-RSRP report), wherein each active link is a link that can be designated via an UL grant for UL transmission by the UE. Additionally, processor 320 can configure a distinct set of power control parameters for each active link of the set of active links. The set of power control parameters for each link can comprise any of the power control parameters discussed herein, including a reference receive power, a tunable parameter that determines to what extent the calculated transmit power depends on the beamformed pathloss, optional parameters (e.g., modulation and coding scheme (MCS)-specific adjustments, closed-loop power control (CLPC) terms, etc.), or other parameters.

Receiver 310 can also receive (and processor 320 can process) an UL grant (e.g., received via a downlink control information (DCI) message over a 5G physical downlink control channel (xPDCCH) of a serving DL link of the set of links, etc.). The UL grant can indicate a designated active link for the UE to employ when transmitting UL data associated with the UL grant. Optionally, the UL grant can also indicate one or more additional power control parameters (e.g., a UE-specific CLPC parameter, etc.). The designated active link can be indicated via a distinct link identifier associated with that active link or the TRP of that active link. For example, each of the active links of the set of active links can be associated with a distinct link identifier of a set of link identifiers, such as a BRS identifier (BRS ID) of that link (e.g., a wideband signal), an associated reference signal, a virtual cell ID, etc. As another example, the configured set of active links can comprise n (e.g., 4, etc.) active links (e.g., which can be numbered 0 through n−1), and the UL grant can indicate the designated active link via $\lceil \log_2 n \rceil$ bits, where $\lceil\ \rceil$ is the ceiling function. Depending on the type of received signal or message, processing (e.g., by processor 320, processor 420, etc.) can comprise one or more of: identifying physical resources associated with the signal/message, detecting the signal/message, resource element group deinterleaving, demodulation, descrambling, and/or decoding.

Processor 320 can calculate a transmit power for the designated active link. In aspects, processor 320 can calculate the transmit power based at least in part on one or more of: the set of power control parameters for the designated active link, any optional additional power control parameters indicated via the UL grant or determined by the UE, a beamformed pathloss associated with the designated active link, or potentially other factors. In various embodiments, processor 320 can calculate the transmit power as described in greater detail below. Processor 320 can calculate the beamformed pathloss associated with the designated active link based on the B-RSRP measured for the designated active link and a known transmit power of the set of BRSs from which that B-RSRP was measured. In some aspects, processor 320 can calculate an associated beamformed pathloss for each active link of the set of active links based on the B-RSRP measured for that active link (or, in some aspects, for each link of the set of links based on the B-RSRP measured for that link).

Processor 320 can output UL data to transmitter circuitry 330 for transmission via the designated active link at the calculated transmit power (e.g., processor 320 can indicate the calculated transmit power to transmitter circuitry 330 or set a transmit power of transmitter circuitry 330 to the calculated transmit power, etc.). Depending on the type of signal or message generated, outputting for transmission (e.g., by processor 320, processor 420, etc.) can comprise one or more of: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a set of time and frequency resources granted for uplink transmission, etc.).

Figure 4:
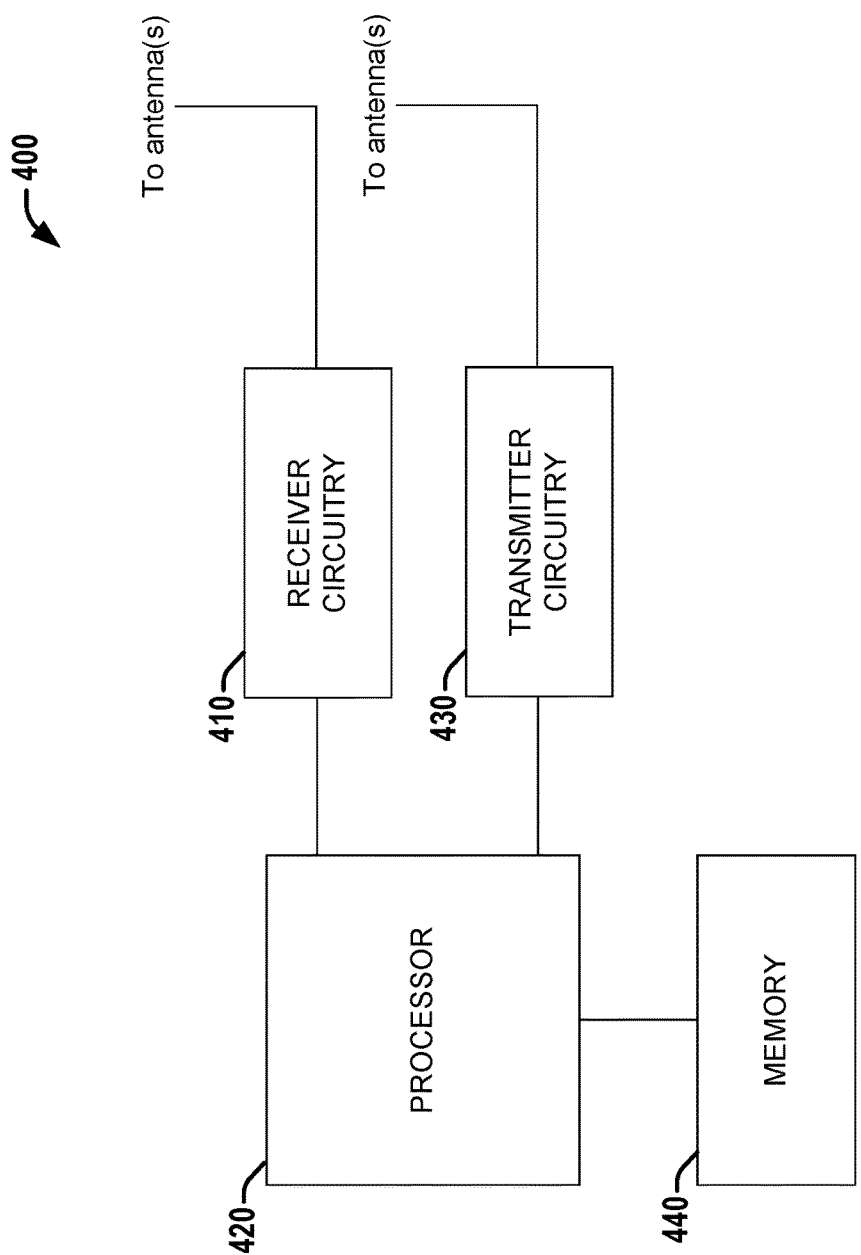
FIG. 4 is a block diagram illustrating a system that facilitates configuration of a UE for autonomous transmit power control by a base station according to various aspects described herein.

Referring to FIG. 4, illustrated is a block diagram of a system 400 that facilitates configuration of a UE for autonomous transmit power control by a base station according to various aspects described herein. System 400 can include receiver circuitry 410 (e.g., a baseband processor such as one of the baseband processors discussed in connection with FIG. 1), processor 420, transmitter circuitry 430, and memory 440 (which can comprise any of a variety of storage mediums and can store instructions and/or data associated with one or more of receiver circuitry 410, processor 420, or transmitter circuitry 430). In various aspects, system 400 can be included within an Evolved Universal Terrestrial Radio Access Network (E-UTRAN) Node B (Evolved Node B, eNodeB, or eNB) or other base station in a wireless communications network. In some aspects, the receiver circuitry 410, processor 420, the transmitter circuitry 430 and the memory 440 can be included in a single device, while in other aspects, they can be included in different devices, such as part of a distributed architecture. As described in greater detail below, system 400 can facilitate configuration of a UE with power control parameters for each of one or more transmit beams such that the UE can autonomously perform transmit power control for each of the one or more transmit beams.

Receiver 410 can receive a B-RSRP report from a UE which can be processed by processor 420. The B-RSRP report can indicate a set of B-RSRP values measured by the UE, wherein each B-RSRP value of the set of B-RSRP values is associated with a distinct TRP beam of a set of TRP beams.

Processor 420 can determine a set of active links for the UE, which can be based at least in part on the measured B-RSRP values. Additionally, optionally, for at least one active link of the set of active links (e.g., for none, some, or all active links), processor 420 can determine an associated set of power control parameters (e.g., a reference receive power, a tunable parameter that determines to what extent the calculated transmit power depends on the beamformed pathloss, an optional MCS-specific adjustment, an optional CLPC parameter, etc.). In some aspects, each active link can be configured with an associated set of power control parameters at the same time, or a previously configured associated set of power control parameters can be used for some or all active links.

Processor 420 can generate, and output to transmitter circuitry 430 for transmission, a set of configuration messages that indicate the set of active links and the set of power control parameters associated with the at least one active link of the set of active links, which can be transmitted by transmitter circuitry 430 via higher layer signaling.

Processor 420 can also generate an UL grant for the UE that indicates an active link of the set of active links for transmission of UL data by the UE, and optionally indicates one or more additional power control parameters (e.g., a UE-specific CLPC parameter, a MCS-specific adjustment, etc.). The active link can be identified via any of the techniques discussed herein, such as a BRS ID (e.g., via a wideband signal, etc.), virtual cell ID, etc.

Processor 420 can generate the UL grant based on the assumption that the UE will transmit the UL data over the indicated active link at a transmit power determined based at least in part on the set of power control parameters associated with the indicated active link and any optional power control parameters indicated via the UL grant. Processor 420 can output the UL grant to transmitter circuitry 430 for transmission to the UE (e.g., via a serving DL link of the set of links, etc.).

Fifth generation (5G) system design involves a unique set of issues due to the incorporation of analog beamforming and limited RF chains. These issues arise since, at high bandwidths, having multiple RF chains, Power Amplifiers and ADCs/DACs is very expensive. This can be addressed via multiple antenna sub-arrays at both the eNB and the UE, each providing sufficient beamforming gain. This gives the eNB and the UE the ability to form one analog beam per polarization pair (e.g., per 2 "antenna ports") per antenna sub-array, with the possibility to switch beams across symbols and/or subframes.

Figure 5:
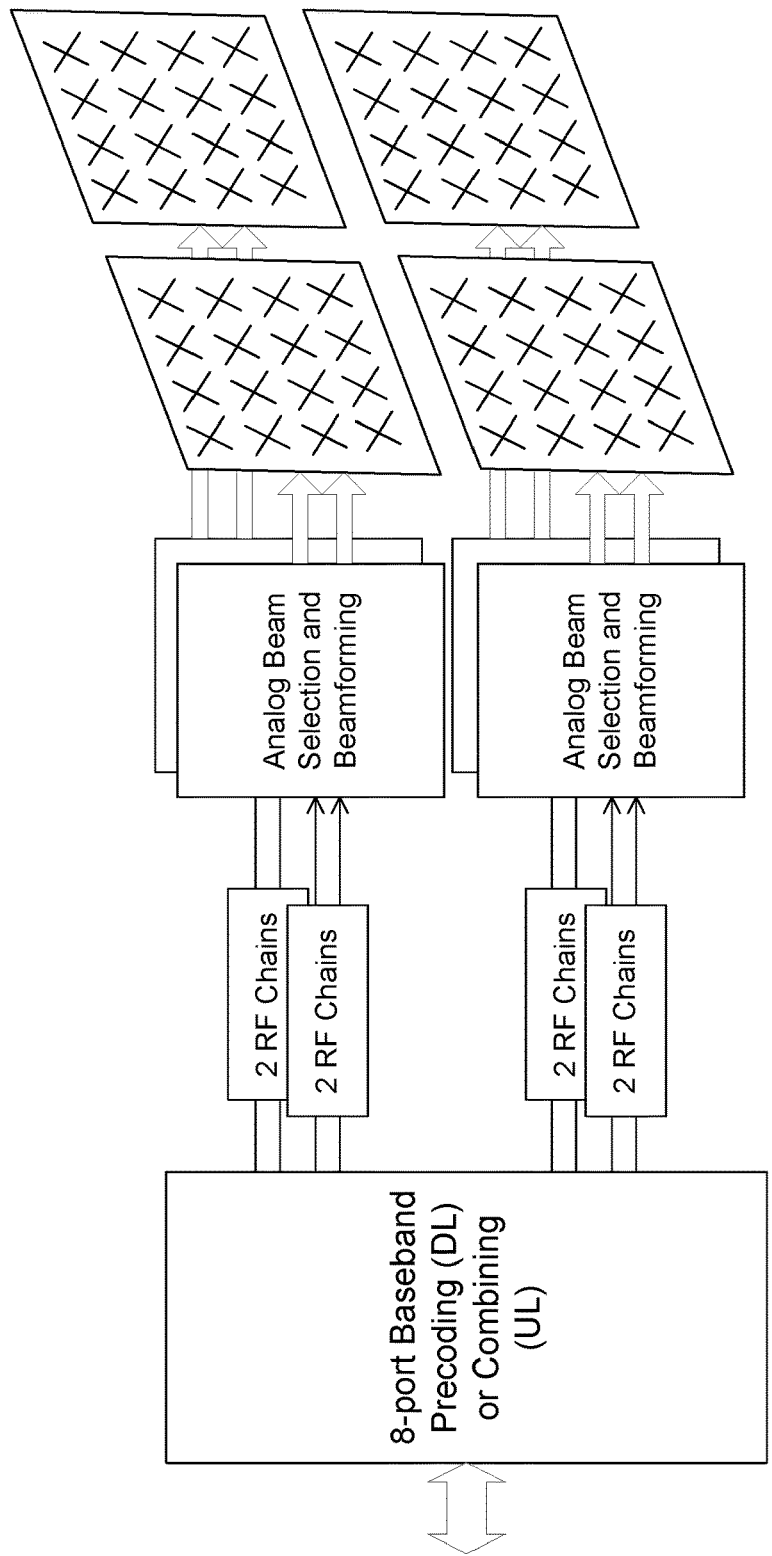
FIG. 5 is a diagram illustrating an example sub-array architecture with analog beam selection and digital precoding/combining that can be employed in connection with various aspects described herein.

Referring to FIG. 5, illustrated is a diagram of an example sub-array architecture with analog beam selection and digital precoding/combining that can be employed in connection with various aspects described herein. The example architecture of FIG. 5 shows four sub-arrays of 4×4 cross-polarized (x-pol) elements (e.g., at an eNB). The baseband signal can be received from a total of eight (4 x-pol) beamformed ports at any given time. Since the selected beamformer in the analog domain is highly spatially selective, it is likely to be applicable to one (or a few at most) UEs in the system. The selection of the analog beams is thus tantamount to selecting which UE(s) to schedule in a particular subframe. This reduces the number of users that can be multiplexed simultaneously, either via frequency domain multiple access (FDMA) or spatial domain multiple access (SDMA or MU-MIMO). This issue is further exacerbated by the fact that 5G systems are expected to typically allow large bandwidth operation (e.g., such as 800 MHz bandwidth) via aggregating multiple component carriers (CCs)—say 8 CCs of 100 MHz bandwidth each. In such a case, user multiplexing issues apply to the entire system bandwidth and not just a component carrier.

On the uplink, traffic may be dominated by short packets, TCP (transmission control protocol) ACKs (acknowledgements), L1 (Layer 1)/L2 (Layer 2) control information (UCI (uplink control information), buffer status reports, power headroom reports, Beam-specific RSRP (reference signal received power) reports, etc.). Therefore, it is likely that many users are buffer-limited. Further, users at the cell-edge are also power-limited, so in many instances it may not be feasible for a single allocation or a few allocations to "fill-the-pipe." Given the relatively large amount of L1/L2/L3 (Layer 3) control information to be sent on the UL (uplink) to satisfy DL (downlink) data-intensive applications, it would be beneficial to employ a mechanism, such as via the techniques described herein, to facilitate scheduling of multiple simultaneous users on the UL to achieve optimal system spectral efficiency.

In various aspects, techniques described herein can facilitate scheduling of multiple simultaneous users via calculation of transmit power at the UE based on parameters provided by an eNB. These calculations can be based at least in part on the beam signal strength and/or the associated pathloss.

To track the UE and provide optimal beamforming gain, 5G systems incorporate the transmission of beamformed reference signals. The Beamformed Reference Signal (BRS) can be transmitted periodically (e.g., every 5 ms) and can be the primary mechanism for the UE to measure beam-specific RSRPs (or B-RSRP) to report to the eNB. The overall information that characterizes the beamformed multi-cell system from a UE's point of view is a set of RSRPs or associated pathlosses, such as the example pathlosses shown in Table 1 below:

TABLE 1

Example of beamformed RSRP/pathloss measurement matrix

| | TRP1, Beam 1 | TRP1, Beam 2 | ... | TRP1, Beam N | TRP2, Beam 1 | ... | TRP2, Beam N |
|---|---|---|---|---|---|---|---|
| UE 1, Beam 1 | PL (1, 1)-(1, 1) | | | | | | |
| UE 1, Beam 2 | | | | PL (1, N)-(1, 2) | | | |
| . | | | | | | | |
| . | | | | | | | |
| . | | | | | | | |
| UE 1, Beam M | | PL (1, 2)-(1, M) | | | | | PL (2, N)-(1, M) |

In an example scenario associated with the data shown in Table 1, a first UE (UE 1) can monitor N beams from each transmission/reception point (TRP). These TRPs may belong to the same or different eNBs. The UE itself can form M beams, and after the acquisition and tracking procedure, it can report the top Z (e.g., Z=4) B-RSRP combinations to its serving eNB. In the notation of Table 1, PL (i,j)-(k,l) refers to the beamformed pathloss derived from the B-RSRP measurements corresponding to TRP i's beam j and UE k's beam l.

This beam management procedure can result in a user being assigned a set of TRP beams (with their corresponding UE beams). This set of TRP beams is corresponding UE beams is associated with a set of links, wherein each link of the set of links comprises a combination of a TRP beam and an associated UE beam. Out of this set of links, a UE may be configured a subset of active links, wherein each active link is a link configured to transmit UL data. When a UE is configured with an active link set that has more than one element, the UE could be capable of receiving (DL) and transmitting (UL) using multiple beams simultaneously, thus enabling either or both SU-MIMO, coordinated multi-point (MIMO/CoMP mode) or transmission over multiple component carriers.

Figure 6:
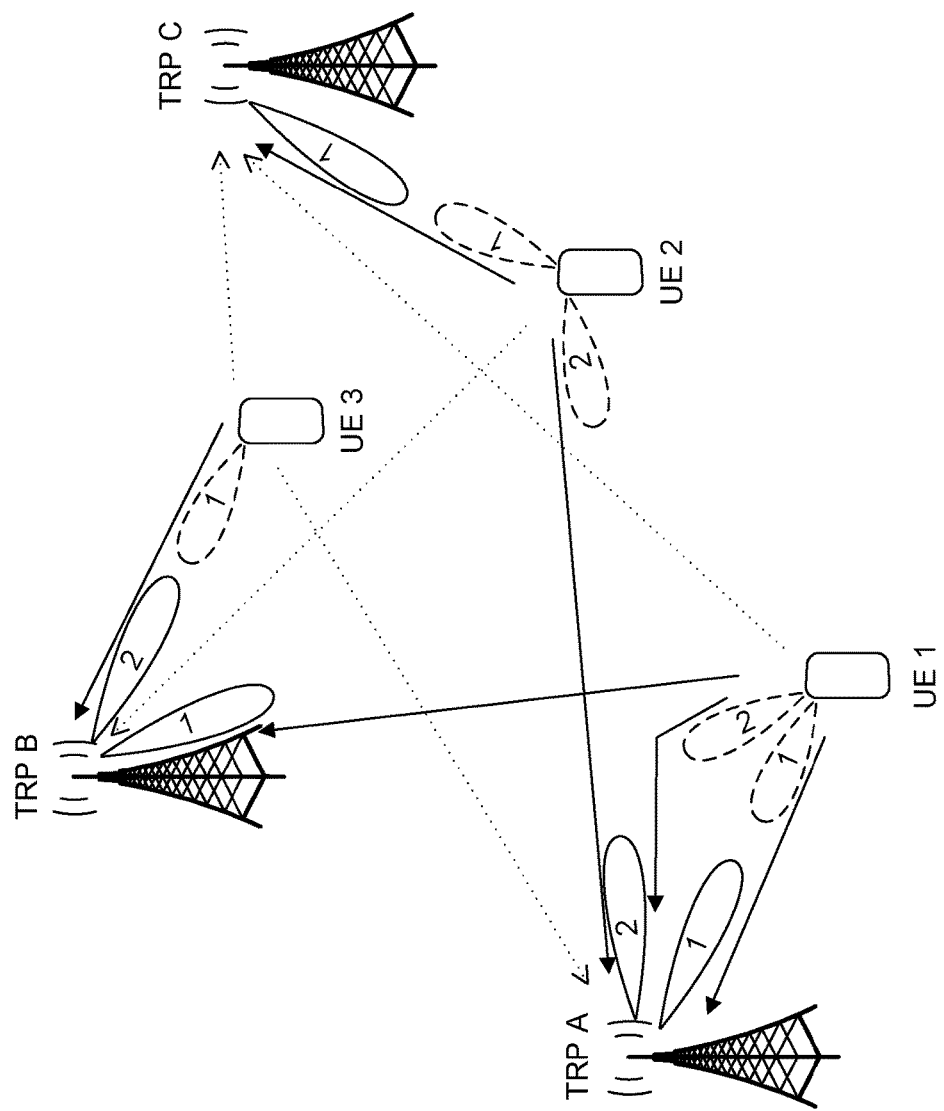
FIG. 6 is a diagram illustrating an example scenario illustrating active links for three UEs in connection with three transmission/reception points (TRPs) according to various aspects described herein.

Referring to FIG. 6, illustrated is a diagram of an example scenario illustrating active links for three UEs (UE 1, UE 2, and UE 3) in connection with three TRPs (TRP A, TRP B, and TRP C) according to various aspects described herein. In the example scenario of FIG. 6, the different UEs have different Active Link Subsets, with UE beams illustrated with dashed lines and TRP beams illustrated with solid lines. UE 1's Active Link Subset is {(TPR A, Beam 1)-(UE 1, Beam 1), (TRP A, Beam 2)-(UE 1, Beam 2), (TRP B, Beam 1)-(UE 1, Beam 2)}; UE 2's Active Link Subset is {(TRP A, Beam 2)-(UE 2, Beam 2), (TRP C, Beam 1)-(UE 2, Beam 1)}; and UE 3's Active Link Subset is {TRP B, Beam 2)-(UE 3, Beam 1)}.

Unlike in conventional LTE (Long Term Evolution) systems, where a UE could get CoMP gain with the same transmission waveform for UL, beamformed transmission/reception in 5G implies that each UL transmission from a UE is associated with its own corresponding transmit beamformer.

However, the notion of an active link subset also can be applied in the non-CoMP mode. In such situations, the UE can be asked to transmit using one link from the Active Link subset, which can be indicated via a link identifier. The link identifier can be, for example, a virtual cell identifier. For each UE, one active link out of the Active Link subset can be a Serving UL Link, and one link out of the set of links for that UE can be a Serving DL Link that can be used for xPDCCH (5G Physical Downlink Control Channel) transmission.

The notion of dynamically activating (or scheduling the UE on) one link from the Active Links can allow the eNB scheduler to flexibly multiplex more users at the same time. For example, two users that may have the same TRP receive beam in common amongst their Active Links subsets can be simultaneously scheduled at the same time.

For uplink power control, the UE transmit power needs to take into account the beamformed pathloss. Active Link management as discussed herein lends itself to allowing more flexibility in scheduling, but can also results in ambiguity about the pathloss value to be used by the UE in the power control procedure. To resolve this ambiguity, the scheduler can, at any given subframe, schedule multiple users simultaneously as long as it indicates to each UE which corresponding link they need to activate for their UL transmission. The UEs can then use the pathloss value corresponding to that particular link in the power control setting.

In the following discussion, the UL PHY (physical) data channel is referred to as xPUSCH (5G Physical Uplink Shared Channel), the DL control channel as xPDCCH (5G Physical Downlink Control Channel) and the sounding reference signal as xSRS (5G Sounding Reference Signal), where the x refers to the new (5G) RAT, referred to as xRAT.

A UE can receive via a downlink control channel (e.g., via xPDCCH) information about the Active Link which has been assigned for that particular UL transmission. The xPDCCH itself can be sent by the eNB and received by the UE using, for example, the TRP and UE beams of the Serving DL Link. Since the xPDCCH UL Grant is typically received a few subframes (e.g., 1-3) before the transmission of the corresponding xPUSCH, this can give the UE sufficient time to switch its beam from the Serving DL Link to the scheduled beam from the Active Link subset.

Various embodiments can facilitate transmit power control determination at a UE for an indicated active link as described in greater detail herein.

A UE can measure a B-RSRP for a set of TRP beams and can report back a subset of eNB beams and corresponding B-RSRPs to the eNB (in a UCI message). The eNB does not need to know which UE Rx beam were used for each eNB Tx beam. The eNB can maintain an Active UL Link subset for the UE, and can indicate the Serving DL and UL Links via higher layer signaling to the UE. The eNB can indicate to the UE (e.g., via RRC or MAC signaling), values of power control parameters (e.g., $P_{o,PUSCH,l}$, $\alpha_l$, etc., as described in greater detail below) specific to each link in the UE's Active Link subset. This can allow the eNB to control interference and rates for the UEs being served on each beam. The method of picking the values of these parameters (and the information used to compute these) can be eNB-implementation specific, and can vary.

For scheduling UL xPUSCH, the eNB scheduler can decide which TRP beam to assign a UE, which can be done in various ways. For example, the eNB can choose a common beam for multiple users in order to schedule multiple FDM users using the same antenna panel. The chosen TRP beam can be common to those scheduled users' Active Link subset. The chosen TRP beam can then translate to an UL Link ID (e.g., via link IDs associated with distinct TRP beams). However, the eNB can determine how to receive the UE's signal during actual transmission, which can be up to the specific eNB receiver implementation.

The eNB indicates the UL Link ID to a UE as part of a DCI message in an UL Grant. In one example, the UL Link ID can be a 2-bit field, which implies that each UE monitors up to 4 active links for B-RSRP computations, and transmits its UL data using the UE beam corresponding to the scheduled UL Link ID. The eNB can send xPDCCH using the beam corresponding to the Serving DL Link, which can be received by the UE over its receive beam corresponding to the Serving DL Link. Since xPDCCH does not use common beams for the multiplexed users, multiple symbols of xPDCCH can be used to support higher number of users multiplexed on xPUSCH.

In various aspects, the eNB can optionally choose to apply a fixed or accumulated closed-loop power control (CLPC) correction and/or optionally apply an MCS-specific correction, as in LTE. CLPC correction can be indicated via CLPC (e.g. a 2-bit) indication in DCI. The CLPC corrections can be based on xSRS measurements, and can reflect short-term changes in received power levels on the scheduled links. The CLPC corrections can also reflect any further proprietary receive beam refinements that the eNB makes on top of the beam corresponding to the UL Link ID. In addition, in some aspects, the UE can transmit the xPUSCH using the transmit beam used for xSRS transmission.

The eNB can assume the transmit power control formula discussed below (equation 1) will be used in its resource allocation procedure, and can allocate a MCS and a number of PRBs using the B-RSRP for the scheduled UL Link ID.

Upon reception of the UL Grant DCI on xPDCCH, the UE can look up its current estimate of B-RSRP for the scheduled UL Link ID. The UE can uses this B-RSRP estimate to set its transmit power according to equation 1 (below), with the scheduled link's B-RSRP used to derive the "serving PL (pathloss)" value, referred to as B–$PL_l$, as well as $P_{o,PUSCH,l}$, and $\alpha_l$ for the scheduled UL Link ID l. The UE can set its power ($P_{tx,l}(i)$) according to equation 1:

$$P_{tx,l}(i)=\max\{P_{max},10*\log_{10}[M_{PUSCH}(i)]+P_{o,PUSCH,l}+\alpha_l B-PL_l+\Delta_{TF,l}(i)+f_l(i)\} \quad (1),$$

Where, in equation 1: $M_{PUSCH}(i)$ is the number of scheduled PRBs for the uplink transmission; $P_{max}$ and $P_{o,PUSCH,l}$ are in dBm and are, respectively, the maximum transmit power and reference receive power spectral density associated with the UL link ID l; $\alpha_l$ is a tunable parameter (e.g., $\alpha_l$=0 can imply fixed power spectral density transmission that can lead to large interference but also favors good users' getting high spectral efficiency (SE), or $\alpha_l$=1 can imply very tight power control (equal received power) that can lead to tighter interference but makes all users achieve similar SE; optional MCS-specific adjustment $\Delta_{TF,l}(i)$ can be specific to each link l; and $f_l(i)$ is a closed-loop power control term that can be either accumulated or instantaneous.

In some aspects, the UE can apply any UE-specific fixed or accumulated closed-loop power corrections as indicated in the DCI message. In the case of accumulated mode of CLPC, the UE can keep a separate CLPC correction term $f_l(i)$ for each link in its Active UL Link subset, and can update and apply the term corresponding to the scheduled UL Link ID. The UE can transmit xPUSCH using the corresponding UE transmit beam for the scheduled UL Link ID at the transmit power determined as described herein.

Figure 7:
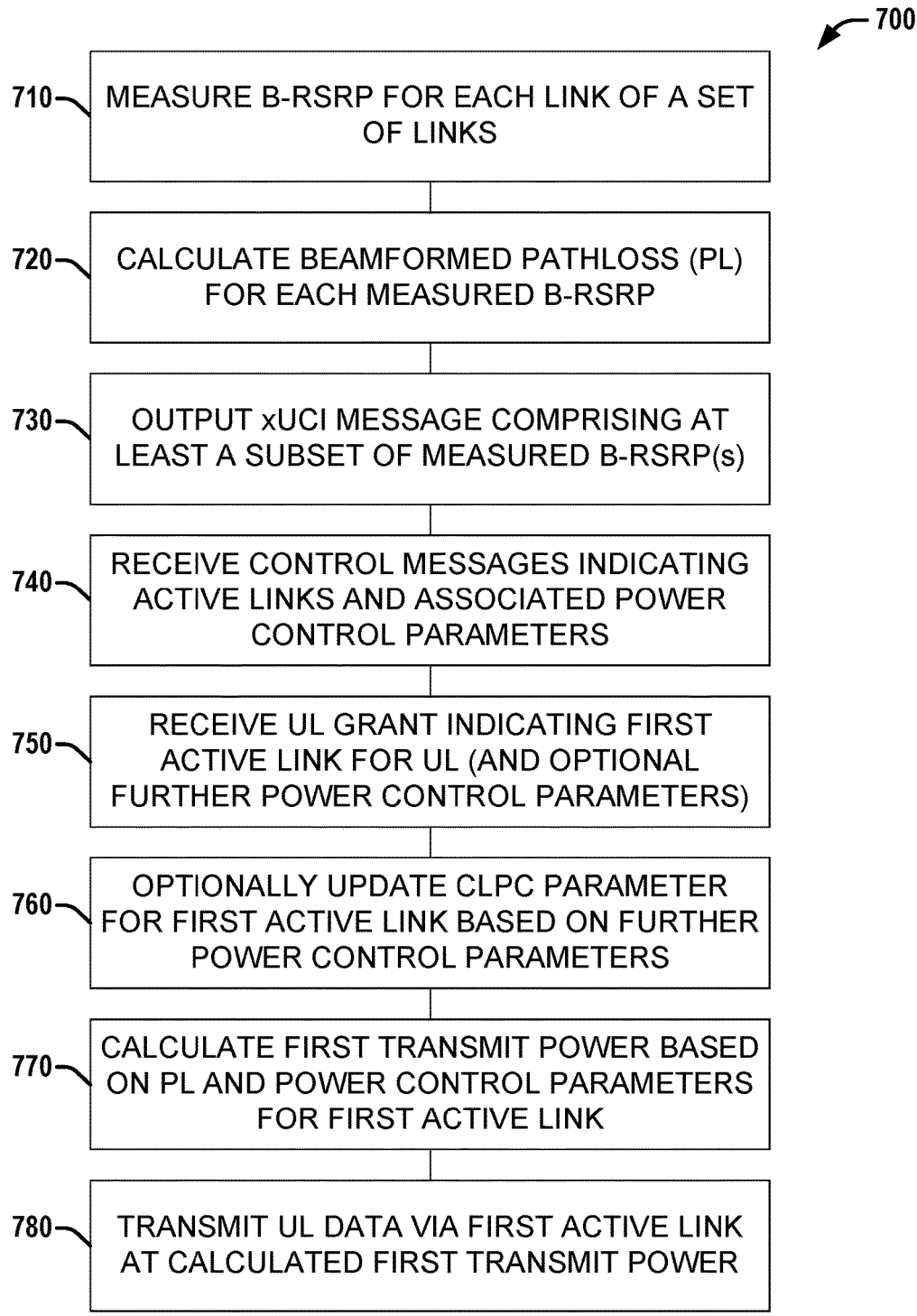
FIG. 7 is a flow diagram illustrating a method that facilitates transmit power control by a UE according to various aspects described herein.

Referring to FIG. 7, illustrated is a flow diagram of a method 700 that facilitates transmit power control by a UE according to various aspects described herein. In some aspects, method 700 can be performed at a UE. In other aspects, a machine readable medium can store instructions associated with method 700 that, when executed, can cause a UE to perform the acts of method 700.

At 710, method 700 can comprise measuring, for each link of a set of links (e.g., with each link comprising a distinct combination of a UE beam and a TRP beam), one or more B-RSRPs associated with that link. Each B-RSRP can be calculated for each link based on a set of BRS signals received at the UE via the TRP beam of that link over the UE beam of that link.

At 720, a beamformed pathloss (PL) can be calculated for one or more links of the set of links. For example, a beamformed PL can be calculated for each link of the set of links, for each active link of a set of active links configured as described herein, for an active link associated with a UL grant, etc.

At 730, a B-RSRP report can be generated and output via a xUCI message to an eNB. The B-RSRP report can comprise at least a subset of the measured B-RSRPs (e.g., the Z (e.g., 4) highest B-RSRPs associated with distinct TRPs, etc.).

At 740, a set of control messages (e.g., based on the B-RSRP report, etc.) can be received that indicate a set of active links (for UL transmission) as a subset of the set of links, and a distinct set of power control parameters associated with each active link of the set of active links.

At 750, a UL grant can be received indicating a first active link for transmission of UL data, and optionally also indicating one or more further power control parameters (e.g., an MCS-specific parameter, a CLPC parameter, etc.). The first active link can be indicated in a variety of ways. For example, if there are n (e.g., 4) active links in the set of active links, it can be indicated via a minimum number of bits required to indicate a distinct active link (e.g., via 2 bits when there are 4 active links, or in general, via $\lceil \log_2 n \rceil$ bits, where $\lceil \ \rceil$ is the ceiling function). In some aspects, the first active link can be indicated via a BRS ID of the TRP beam of the first active link (e.g., via a wideband signal), or the first active link can be indicated via an associated virtual cell ID. In some aspects wherein the UL grant indicates a CLPC parameter, the CLPC parameter can be instantaneous, and can be applied by the UE in power control calculations.

Optionally, at 760, in aspects wherein the UL grant indicates a CLPC parameter, the indicated CLPC parameter can be used to update an accumulated CLPC parameter maintained by the UE.

At 770, a first transmit power can be calculated, which can be based at least in part on the beamformed PL calculated for the first active link, the set of power control parameters configured for the first active link, and any optional further power control parameters received via the UL grant (or updated based on parameters received via the UL grant, in the case of an accumulated CLPC parameter maintained by the UE).

At 780, UL data can be transmitted via the UE beam of the first active link, at the calculated first transmit power.

Figure 8:
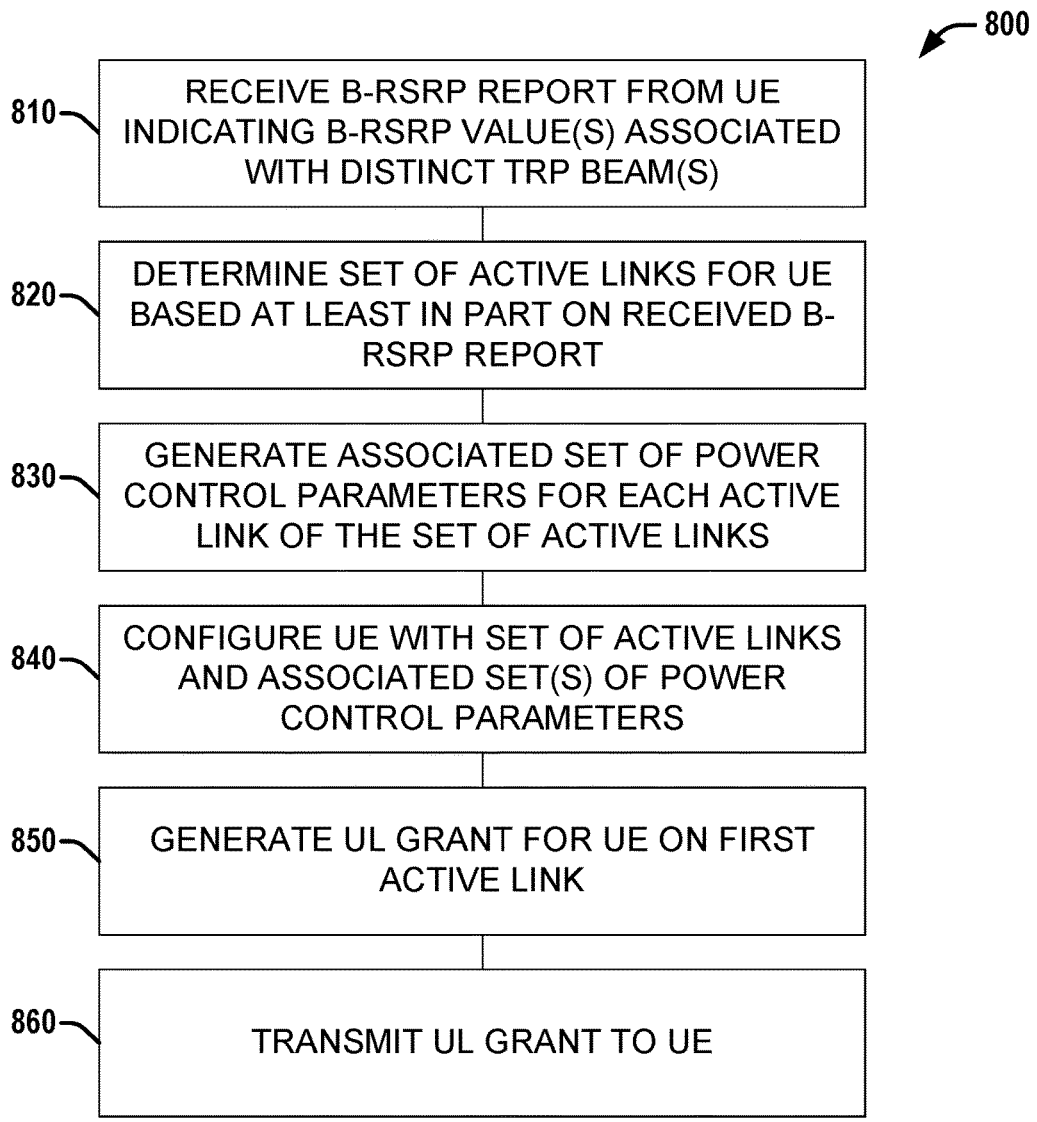
FIG. 8 is a flow diagram illustrating a method that facilitates configuration of a UE for transmit power control calculation by a base station according to various aspects described herein.

Referring to FIG. 8, illustrated is a flow diagram of a method 800 that facilitates configuration of a UE for transmit power control calculation by a base station according to various aspects described herein. In some aspects, method 800 can be performed at an eNB. In other aspects, a machine readable medium can store instructions associated with method 800 that, when executed, can cause an eNB to perform the acts of method 800.

At 810, method 800 can comprise receiving a B-RSRP report from a UE. The B-RSRP report can comprise one or more B-RSRP values measured by the UE, each of which can be associated with a distinct TRP beam (which can be of the eNB implementing method 800 or another eNB).

At 820, a set of active links can be determined for the UE. The set of active links can be determined based at least in part on the received B-RSRP report, and potentially on other factors.

At 830, for each active link in the set of active links, an associated set of power control parameters can be determined (e.g., one or more of the parameters discussed herein, such as those discussed in connection with equation 1, etc.).

At 840, the UE can be configured with the set of active links and each associated set of power control parameters via higher layer signaling.

At 850, an UL grant can be generated scheduling the UE for UL transmission on a first active link of the set of active links, based on the assumption that the UE will employ a transmit power control determined based at least in part on the beamformed PL associated with the measured B-RSRP of the first active link and the set of power control parameters associated with the first active link. Optionally, the UL grant can include one or more additional power control parameters (e.g., MCS-specific, CLPC, etc.).

At 860, the UL grant can be transmitted to the UE.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a User Equipment (UE), comprising a processor configured to: configure, for each active link of a set of active links, a distinct set of power control parameters received via higher layer signaling, wherein the set of active links is a subset of a set of links that each comprise a distinct combination of a UE beam of a set of UE beams and a transmission/reception point (TRP) beam of a set of TRP beams; process an uplink (UL) grant received via a control channel that indicates a first active link of the set of active links, wherein the first active link comprises a first UE beam and a first TRP beam; calculate a first transmit power based at least in part on the distinct set of power control parameters configured for the first active link; and output UL data for transmission via the first UE beam, wherein the UL data is output to be transmitted at the first transmit power.

Example 2 comprises the subject matter of any variation of example 1, wherein the processor is configured to calculate the first transmit power based on a first beamformed pathloss associated with the first active link.

Example 3 comprises the subject matter of any variation of example 2, wherein the processor is configured to calculate, for each active link of the set of active links, an associated beamformed pathloss based on a beam-specific reference signal received power (B-RSRP) measured for that active link, wherein the first beamformed pathloss is the associated beamformed pathloss calculated for the first active link.

Example 4 comprises the subject matter of any variation of example 3, wherein the processor is configured to output, for transmission via a serving UL link of the set of active links, a B-RSRP report comprising the B-RSRPs measured for each active link of the set of active links.

Example 5 comprises the subject matter of any variation of example 4, wherein the set of active links is configured from the set of links based on one or more configuration messages received in response to the B-RSRP report.

Example 6 comprises the subject matter of any variation of any of examples 1-5, wherein the UL grant indicates the first active link via an indicated link identifier, wherein each active link of the set of active links is associated with a distinct link identifier of a set of link identifiers, and wherein the processor is further configured to identify the first active link based on the indicated link identifier and the set of link identifiers.

Example 7 comprises the subject matter of any variation of example 6, wherein the indicated link identifier is a beam reference signal (BRS) identifier associated with the first TRP beam.

Example 8 comprises the subject matter of any variation of example 7, wherein the BRS identifier is a wideband signal.

Example 9 comprises the subject matter of any variation of example 6, wherein each distinct link identifier of the set of link identifiers is associated with a reference signal.

Example 10 comprises the subject matter of any variation of example 6, wherein the indicated link identifier is a virtual cell identifier.

Example 11 comprises the subject matter of any variation of any of examples 1-5, wherein the set of active links comprises four active links.

Example 12 comprises the subject matter of any variation of any of examples 1-10, wherein the set of active links comprises four active links.

Example 13 comprises the subject matter of any variation of example 1, wherein the UL grant indicates the first active link via an indicated link identifier, wherein each active link of the set of active links is associated with a distinct link identifier of a set of link identifiers, and wherein the processor is further configured to identify the first active link based on the indicated link identifier and the set of link identifiers.

Example 14 comprises the subject matter of any variation of example 1, wherein the set of active links comprises four active links.

Example 15 is a machine readable medium comprising instructions that, when executed, cause a User Equipment (UE) to: measure, for each link of a set of links, a beam-specific reference signal received power (B-RSRP) associated with that link, wherein each link of the set of links comprises a distinct combination of a UE beam of a set of UE beams and a transmission/reception point (TRP) beam of a set of TRP beams; calculate a beamformed pathloss associated with each measured B-RSRP; transmit a fifth generation uplink control information (xUCI) message comprising one or more of the measured B-RSRPs; receive a set of control messages indicating a set of active links comprising a subset of the set of links, and a distinct set of power control parameters for each active link of the set of active links; receive an UL grant that indicates a first active link of the set of active links; calculate a first transmit power based at least in part on a first beamformed pathloss associated with a first B-RSRP measured for the first active link and on the distinct set of power control parameters for the first active link; and transmit UL data via a first UE beam of the first active link at the first transmit power.

Example 16 comprises the subject matter of any variation of example 15, wherein each B-RSRP is measured based on a set of beam reference signals (BRSs) received via the TRP beam of the link associated with that B-RSRP.

Example 17 comprises the subject matter of any variation of example 15, wherein the UL grant indicates a modulation and coding scheme (MCS)-specific adjustment, and wherein the instructions cause the UE to calculate the first transmit power based at least in part on the MCS-specific adjustment.

Example 18 comprises the subject matter of any variation of any of examples 15-17, wherein the UL grant indicates a closed-loop power control parameter, and wherein the instructions cause the UE to calculate the first transmit power based at least in part on the indicated closed-loop power control parameter.

Example 19 comprises the subject matter of any variation of example 18, wherein the closed-loop power control parameter is an instantaneous parameter.

Example 20 comprises the subject matter of any variation of example 18, wherein the instructions cause the UE to update an accumulated closed-loop power control parameter based on the indicated closed-loop power control parameter, and wherein the instructions cause the UE to calculate the first transmit power based at least in part on the accumulated closed-loop power control parameter.

Example 21 comprises the subject matter of any variation of any of examples 15-17, wherein the UL grant indicates the first active link via a link identifier associated with the first active link.

Example 22 comprises the subject matter of any variation of example 21, wherein the link identifier is a beam reference signal (BRS) identifier associated with a first TRP beam of the first active link.

Example 23 comprises the subject matter of any variation of example 22, wherein the BRS identifier is a wideband signal.

Example 24 comprises the subject matter of any variation of example 21, wherein the link identifier is a virtual cell identifier.

Example 25 comprises the subject matter of any variation of example 15, wherein the UL grant indicates a closed-loop power control parameter, and wherein the instructions cause the UE to calculate the first transmit power based at least in part on the indicated closed-loop power control parameter.

Example 26 comprises the subject matter of any variation of example 15, wherein the UL grant indicates the first active link via a link identifier associated with the first active link.

Example 27 is an apparatus configured to be employed within an Evolved NodeB (eNB), comprising a processor configured to: process a beam-specific reference signal received power (B-RSRP) report received via receiver circuitry from a user equipment (UE), wherein the B-RSRP report comprises a set of measured B-RSRP values, wherein each of the measured B-RSRP values is associated with a transmission/reception point (TRP) beam of a set of TRP beams; determine a set of active links for the UE, wherein each active link of the set of active links is associated with a distinct TRP beam of the set of TRP beams; generate, for each active link of the set of active links, an associated set of power control parameters; output for transmission one or more configuration messages that indicate each active link of the set of active links and the associated set of power control parameters for each active link of the set of active links; generate an uplink (UL) grant for the UE associated with a first active link of the set of active links, wherein the UL grant is generated based at least in part on the assumption that a transmit power employed by the UE for UL transmission will be based at least in part on the set of power control parameters associated with the first active link; and output the UL grant for transmission to the UE.

Example 28 comprises the subject matter of any variation of example 27, wherein the UL grant indicates a closed-loop power control parameter, wherein the UL grant is generated based at least in part on the assumption that the transmit power employed by the UE for UL transmission will be based at least in part on the closed-loop power control parameter.

Example 29 comprises the subject matter of any variation of example 27, wherein the UL grant indicates a modulation and coding scheme (MCS)-specific adjustment, and wherein the UL grant is generated based at least in part on the assumption that the transmit power employed by the UE for UL transmission will be based at least in part on the MCS-specific adjustment.

Example 30 comprises the subject matter of any variation of any of examples 27-29, wherein the UL grant indicates the first active link via an indicated link identifier, and wherein each active link of the set of active links is associated with a distinct link identifier of a set of link identifiers.

Example 31 comprises the subject matter of any variation of example 30, wherein the indicated link identifier is a beam reference signal (BRS) identifier associated with the distinct TRP beam associated with the first active link.

Example 32 comprises the subject matter of any variation of example 31, wherein the BRS identifier is a wideband signal.

Example 33 comprises the subject matter of any variation of example 30, wherein each distinct link identifier of the set of link identifiers is associated with a reference signal.

Example 34 comprises the subject matter of any variation of example 30, wherein the indicated link identifier is a virtual cell identifier.

Example 35 comprises the subject matter of any variation of any of examples 27-29, wherein the set of active links comprises four active links.

Example 36 comprises the subject matter of any variation of example 27, wherein the UL grant indicates the first active link via an indicated link identifier, and wherein each active link of the set of active links is associated with a distinct link identifier of a set of link identifiers.

Example 37 comprises the subject matter of any variation of example 27, wherein the set of active links comprises four active links.

Example 38 is an apparatus configured to be employed within a User Equipment (UE), comprising means for processing, means for receiving, and means for transmitting. The means for processing is configured to: measure, for each link of a set of links, a beam-specific reference signal received power (B-RSRP) associated with that link, wherein each link of the set of links comprises a distinct combination of a UE beam of a set of UE beams and a transmission/reception point (TRP) beam of a set of TRP beams; and calculate a beamformed pathloss associated with each measured B-RSRP. The means for transmitting is configured to transmit a fifth generation uplink control information (xUCI) message comprising one or more of the measured B-RSRPs. The means for receiving is configured to receive a set of control messages indicating a set of active links comprising a subset of the set of links, and a distinct set of power control parameters for each active link of the set of active links; and receive an UL grant that indicates a first active link of the set of active links. The means for processing is further configured to calculate a first transmit power based at least in part on a first beamformed pathloss associated with a first B-RSRP measured for the first active link and on the distinct set of power control parameters for the first active link. The means for transmitting is further configured to transmit UL data via a first UE beam of the first active link at the first transmit power.

Example 39 comprises the subject matter of any variation of example 38, wherein each B-RSRP is measured based on a set of beam reference signals (BRSs) received via the TRP beam of the link associated with that B-RSRP.

Example 40 comprises the subject matter of any variation of example 38, wherein the UL grant indicates a modulation and coding scheme (MCS)-specific adjustment, and wherein the means for processing is further configured to calculate the first transmit power based at least in part on the MCS-specific adjustment.

Example 41 comprises the subject matter of any variation of any of examples 38-40, wherein the UL grant indicates a closed-loop power control parameter, and wherein the means for processing is further configured to calculate the first transmit power based at least in part on the indicated closed-loop power control parameter.

Example 42 comprises the subject matter of any variation of example 41, wherein the closed-loop power control parameter is an instantaneous parameter.

Example 43 comprises the subject matter of any variation of example 41, wherein the means for processing is further configured to update an accumulated closed-loop power control parameter based on the indicated closed-loop power control parameter, and wherein the instructions cause the UE to calculate the first transmit power based at least in part on the accumulated closed-loop power control parameter.

Example 44 comprises the subject matter of any variation of any of examples 38-40, wherein the UL grant indicates the first active link via a link identifier associated with the first active link.

Example 45 comprises the subject matter of any variation of example 44, wherein the link identifier is a beam reference signal (BRS) identifier associated with a first TRP beam of the first active link.

Example 46 comprises the subject matter of any variation of example 45, wherein the BRS identifier is a wideband signal.

Example 47 comprises the subject matter of any variation of example 44, wherein the link identifier is a virtual cell identifier.

Example 48 comprises the subject matter of any variation of any of examples 1-5, wherein the control channel is one of a physical downlink control channel (PDCCH), an enhanced PDCCH (EPDCCH), or a fifth generation (5G) PDCCH (xPDCCH), and wherein the processor being configured to process the UL grant comprises the processor being configured to decode a downlink control information (DCI) message that indicates the UL grant.

Example 49 comprises the subject matter of any variation of any of examples 27-29, wherein the B-RSRP report is received via a physical uplink shared channel (PUSCH) or a fifth generation (5G) PUSCH (xPUSCH), and wherein the processor being configured to process the B-RSRP report comprises the processor being configured to decode the B-RSRP report.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within a User Equipment (UE), comprising a processor configured to:
   configure, for each active link of a set of active links, a distinct set of power control parameters received via higher layer signaling, wherein the set of active links is a subset of a set of links that each comprise a distinct combination of a UE beam of a set of UE beams and a transmission/reception point (TRP) beam of a set of TRP beams;
   process an uplink (UL) grant received via a control channel that indicates a first active link of the set of active links, wherein the first active link comprises a first UE beam and a first TRP beam;
   measure, for each active link of the set of active links, a beam-specific reference signal received power (B-RSRP) for that active link;
   calculate a first transmit power based at least in part on the distinct set of power control parameters configured for the first active link, based at least in part on a first B-RSRP measured for the first active link; and
   output UL data for transmission via the first UE beam, wherein the UL data is output to be transmitted at the first transmit power.

2. The apparatus of claim 1, wherein the processor is configured to calculate the first transmit power based on a first beamformed pathloss associated with the first active link.

3. The apparatus of claim 2, wherein the processor is configured to calculate, for each active link of the set of active links, an associated beamformed pathloss based on the B-RSRP measured for that active link, wherein the first beamformed pathloss is the associated beamformed pathloss calculated for the first active link.

4. The apparatus of claim 3, wherein the processor is configured to output, for transmission via a serving UL link of the set of active links, a B-RSRP report comprising the B-RSRPs measured for each active link of the set of active links.

5. The apparatus of claim 4, wherein the set of active links is configured from the set of links based on one or more configuration messages received in response to the B-RSRP report.

6. The apparatus of claim 1, wherein the UL grant indicates the first active link via an indicated link identifier, wherein each active link of the set of active links is associated with a distinct link identifier of a set of link identifiers, and wherein the processor is further configured to identify the first active link based on the indicated link identifier and the set of link identifiers.

7. The apparatus of claim 6, wherein the indicated link identifier is a beam reference signal (BRS) identifier associated with the first TRP beam.

8. The apparatus of claim 7, wherein the BRS identifier is a wideband signal.

9. The apparatus of claim 6, wherein each distinct link identifier of the set of link identifiers is associated with a reference signal.

10. The apparatus of claim 6, wherein the indicated link identifier is a virtual cell identifier.

11. The apparatus of claim 1, wherein the set of active links comprises four active links.

12. The apparatus of claim 1, wherein the control channel is one of a physical downlink control channel (PDCCH), an enhanced PDCCH (EPDCCH), or a fifth generation (5G) PDCCH (xPDCCH), and wherein the processor being configured to process the UL grant comprises the processor being configured to decode a downlink control information (DCI) message that indicates the UL grant.

13. A non-transitory machine readable medium comprising instructions that, when executed, cause a User Equipment (UE) to:
measure, for each link of a set of links, a beam-specific reference signal received power (B-RSRP) associated with that link, wherein each link of the set of links comprises a distinct combination of a UE beam of a set of UE beams and a transmission/reception point (TRP) beam of a set of TRP beams;
calculate a beamformed pathloss associated with each measured B-RSRP;
transmit a fifth generation uplink control information (xUCI) message comprising one or more of the measured B-RSRPs;
receive a set of control messages indicating a set of active links comprising a subset of the set of links, and a distinct set of power control parameters for each active link of the set of active links;
receive an UL grant that indicates a first active link of the set of active links;
calculate a first transmit power based at least in part on a first beamformed pathloss associated with a first B-RSRP measured for the first active link and on the distinct set of power control parameters for the first active link; and
transmit UL data via a first UE beam of the first active link at the first transmit power.

14. The machine readable medium of claim 13, wherein each B-RSRP is measured based on a set of beam reference signals (BRSs) received via the TRP beam of the link associated with that B-RSRP.

15. The machine readable medium of claim 13, wherein the UL grant indicates a modulation and coding scheme (MCS)-specific adjustment, and wherein the instructions cause the UE to calculate the first transmit power based at least in part on the MCS-specific adjustment.

16. The machine readable medium of claim 13, wherein the UL grant indicates a closed-loop power control parameter, and wherein the instructions cause the UE to calculate the first transmit power based at least in part on the indicated closed-loop power control parameter.

17. The machine readable medium of claim 16, wherein the closed-loop power control parameter is an instantaneous parameter.

18. The machine readable medium of claim 16, wherein the instructions cause the UE to update an accumulated closed-loop power control parameter based on the indicated closed-loop power control parameter, and wherein the instructions cause the UE to calculate the first transmit power based at least in part on the accumulated closed-loop power control parameter.

19. The machine readable medium of claim 13, wherein the UL grant indicates the first active link via a link identifier associated with the first active link.

20. The machine readable medium of claim 19, wherein the link identifier is a beam reference signal (BRS) identifier associated with a first TRP beam of the first active link.

21. An apparatus configured to be employed within an Evolved NodeB (eNB), comprising a processor configured to:
process a beam-specific reference signal received power (B-RSRP) report received via receiver circuitry from a user equipment (UE), wherein the B-RSRP report comprises a set of measured B-RSRP values, wherein each of the measured B-RSRP values is associated with a transmission/reception point (TRP) beam of a set of TRP beams;
determine a set of active links for the UE, wherein each active link of the set of active links is associated with a distinct TRP beam of the set of TRP beams;
generate, for each active link of the set of active links, an associated set of power control parameters;
output for transmission one or more configuration messages that indicate each active link of the set of active links and the associated set of power control parameters for each active link of the set of active links;
generate an uplink (UL) grant for the UE associated with a first active link of the set of active links, wherein the UL grant is generated based at least in part on the assumption that a transmit power employed by the UE for UL transmission will be based at least in part on the set of power control parameters associated with the first active link; and
output the UL grant for transmission to the UE.

22. The apparatus of claim 21, wherein the UL grant indicates a closed-loop power control parameter, wherein the UL grant is generated based at least in part on the assumption that the transmit power employed by the UE for UL transmission will be based at least in part on the closed-loop power control parameter.

23. The apparatus of claim 21, wherein the UL grant indicates a modulation and coding scheme (MCS)-specific adjustment, and wherein the UL grant is generated based at least in part on the assumption that the transmit power employed by the UE for UL transmission will be based at least in part on the MCS-specific adjustment.

24. The apparatus of claim 21, wherein the UL grant indicates the first active link via an indicated link identifier, and wherein each active link of the set of active links is associated with a distinct link identifier of a set of link identifiers.

25. The apparatus of claim 24, wherein the indicated link identifier is a beam reference signal (BRS) identifier associated with the distinct TRP beam associated with the first active link.

26. The apparatus of claim 25, wherein the BRS identifier is a wideband signal.

27. The apparatus of claim 24, wherein each distinct link identifier of the set of link identifiers is associated with a reference signal.

28. The apparatus of claim 24, wherein the indicated link identifier is a virtual cell identifier.

29. The apparatus of claim 21, wherein the set of active links comprises four active links.

30. The apparatus of claim 21, wherein the B-RSRP report is received via a physical uplink shared channel (PUSCH) or a fifth generation (5G) PUSCH (xPUSCH), and wherein the processor being configured to process the B-RSRP report comprises the processor being configured to decode the B-RSRP report.

* * * * *